US005980984A

United States Patent [19]

[11] Patent Number: 5,980,984

Modera et al.

[45] Date of Patent: Nov. 9, 1999

[54] METHOD FOR SEALING REMOTE LEAKS IN AN ENCLOSURE USING AN AEROSOL

[75] Inventors: Mark P. Modera, Piedmont, Calif.; Francois R. Carrie, Lyons, France

[73] Assignee: The Regents of The University of California, Oakland, Calif.

[21] Appl. No.: 08/947,921

[22] Filed: Oct. 9, 1997

Related U.S. Application Data

[63] Continuation of application No. 08/554,170, Nov. 6, 1995, abandoned, which is a continuation-in-part of application No. 08/333,980, Nov. 4, 1994, Pat. No. 5,522,930.

[51] Int. Cl.[6] .......... B05D 7/22

[52] U.S. Cl. .......... 427/237; 427/238; 427/239; 427/236; 427/421

[58] Field of Search .......... 427/230, 237, 427/238, 239, 421, 317, 236

[56] References Cited

U.S. PATENT DOCUMENTS

| | | | |
|---|---|---|---|
| 4,331,722 | 5/1982 | Packo et al. | 427/237 |
| 4,454,174 | 6/1984 | Koga et al. | 427/237 |
| 4,994,307 | 2/1991 | Price et al. | 427/237 |

OTHER PUBLICATIONS

"Particle Deposition in Aerosol Sampling Lines Caused by Turbulent Diffusion and Gravitational Settling," N. K. Anand and A. R. McFarland, Department of Mechanical Engineering, Texas A&M University, College Station, TX 77843, published in *Am.Ind.Hyg.Assoc.J.*(50), Jun., 1989. pp. 307–312.

"Aerosol Deposition in Turbulent Pipe Flow," Benjamin Y. H. Liu and Timothy A. Llori, Particle Technology Laboratory, Mechanical Engineering Department, University of Minnesota, Minneapolis, Minn. 55455, published in vol. 8. No. 4, Apr. 1974, Enviromental Science & Technology, at pp. 351–356.

"Experimental Observation of Aerosol Deposition in Turbulent Flow," Benjamin Y. H. Liu and Jugal K. Agarwal, Particle Technology Laboratory, Mechanical Engineering Department, University of Minnesota, Minneapolis, Minnesota 55455, published in Particle Technology Laboratory Publication No. 206, first received Jul. 31, 1973; in revised form Sep. 3, 1973. pp. 145–155.

"Investigation of a Laminar Boundary–Layer Suction Slot," A.S.W. Thomas and K.C. Cornelius, Lockheed–Georgia company, Marietta, GA, as published in *AIAA Journal*, vol. 20, No. 6, Jun. 1982, at pp. 790–796.

*Primary Examiner*—Shrive Beck
*Assistant Examiner*—Bret Chen
*Attorney, Agent, or Firm*—Paul Martin; Janis Biksa

[57] ABSTRACT

The invention is a method and device for sealing leaks remotely by means of injecting a previously prepared aerosol into the enclosure being sealed according to a particular sealing efficiency defined by the product of a penetration efficiency and a particle deposition efficiency. By using different limits in the relationship between penetration efficiency and flowrate, the same method according the invention can be used for coating the inside of an enclosure. Specifically the invention is a method and device for preparing, transporting, and depositing a solid phase aerosol to the interior surface of the enclosure relating particle size, particle carrier flow rate, and pressure differential, so that particles deposited there can bridge and substantially seal each leak, with out providing a substantial coating at inside surfaces of the enclosure other than the leak. The particle size and flow parameters can be adjusted to coat the interior of the enclosure (duct) without substantial plugging of the leaks depending on how the particle size and flowrate relationships are chosen.

27 Claims, 7 Drawing Sheets

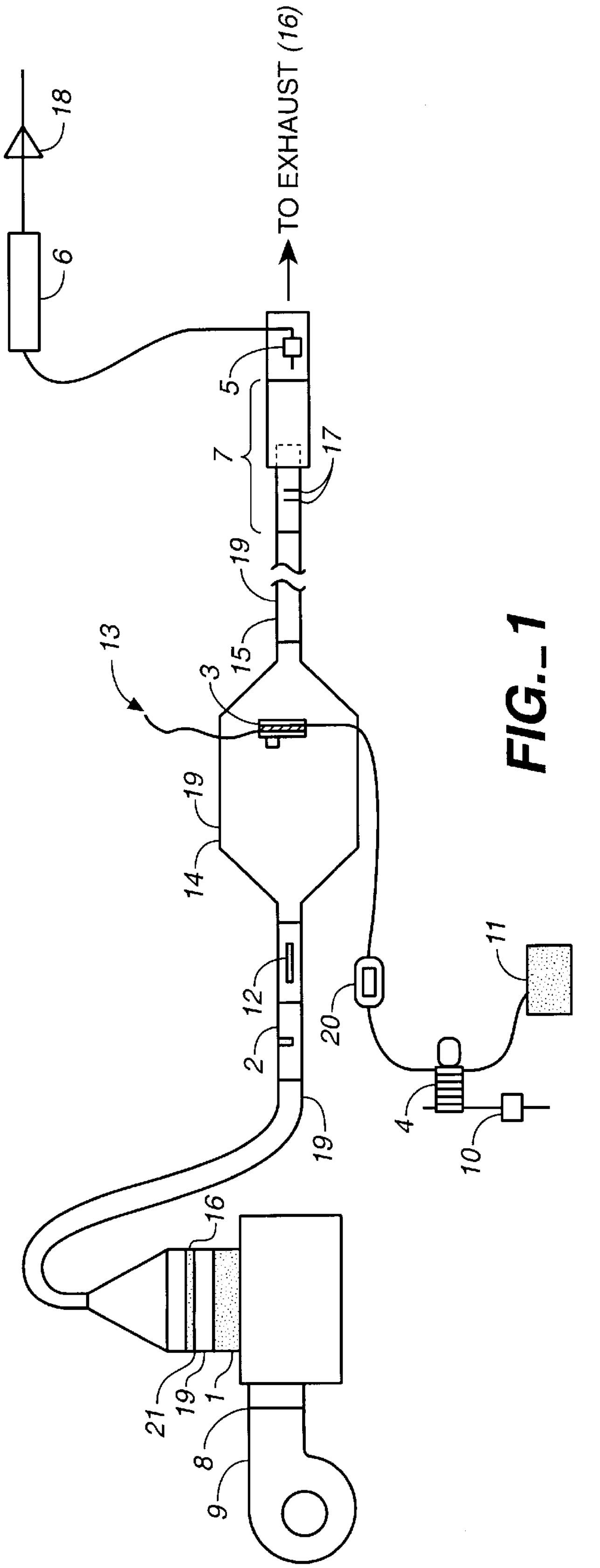
FIG._1

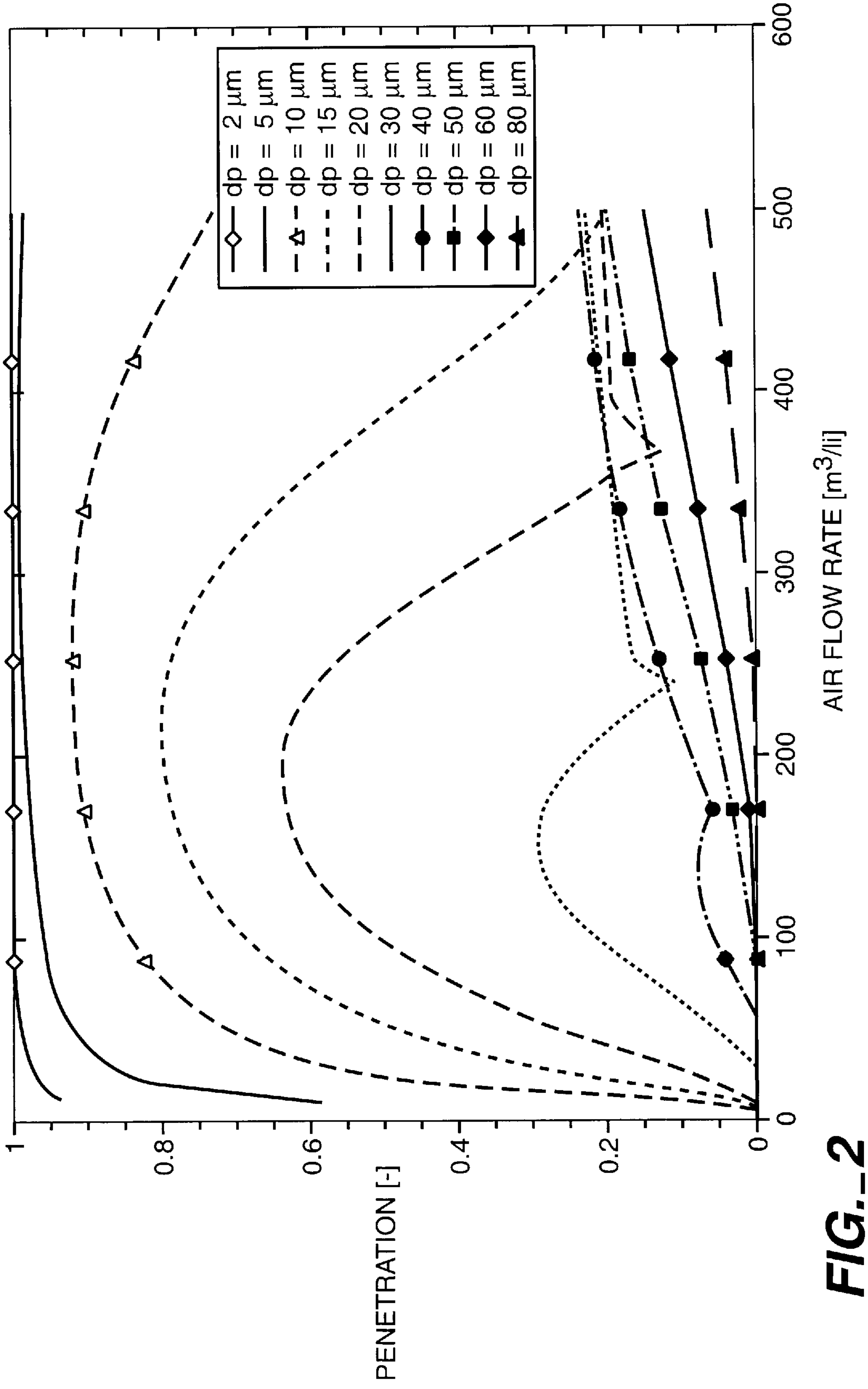
FIG._2

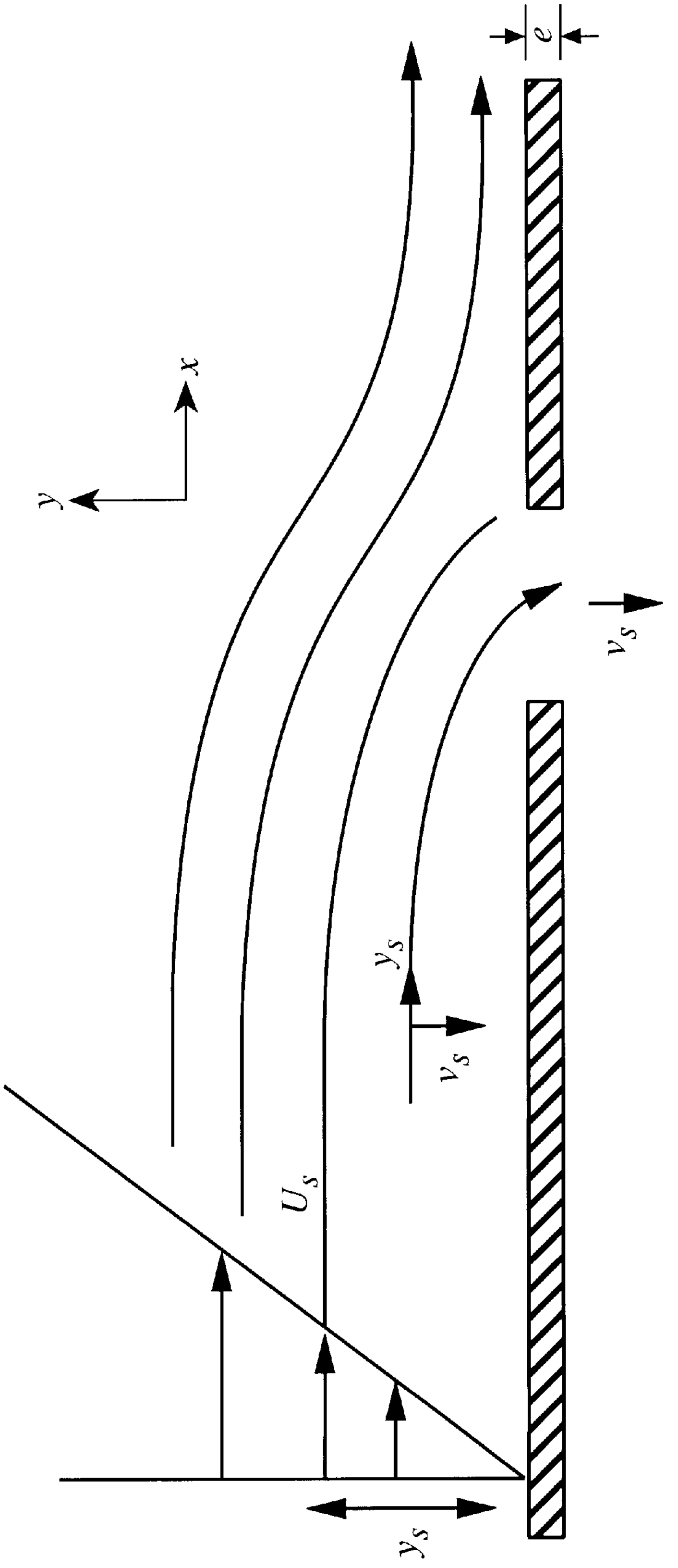
FIG._3

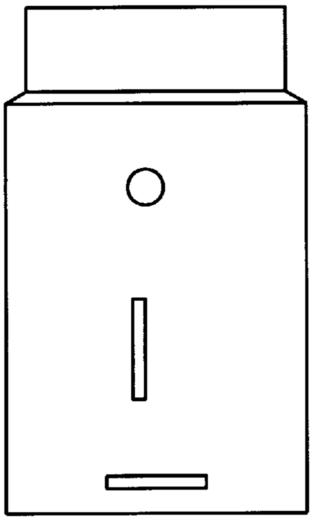
(a)
FIG._4
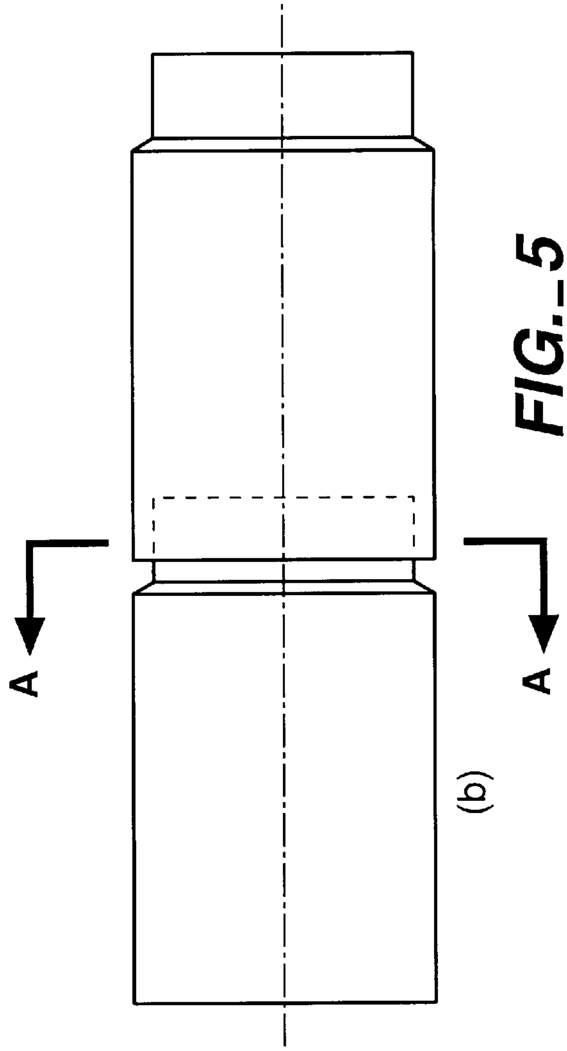
(b)
FIG._5
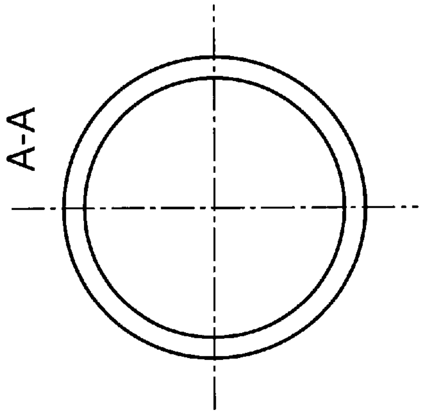
FIG._6

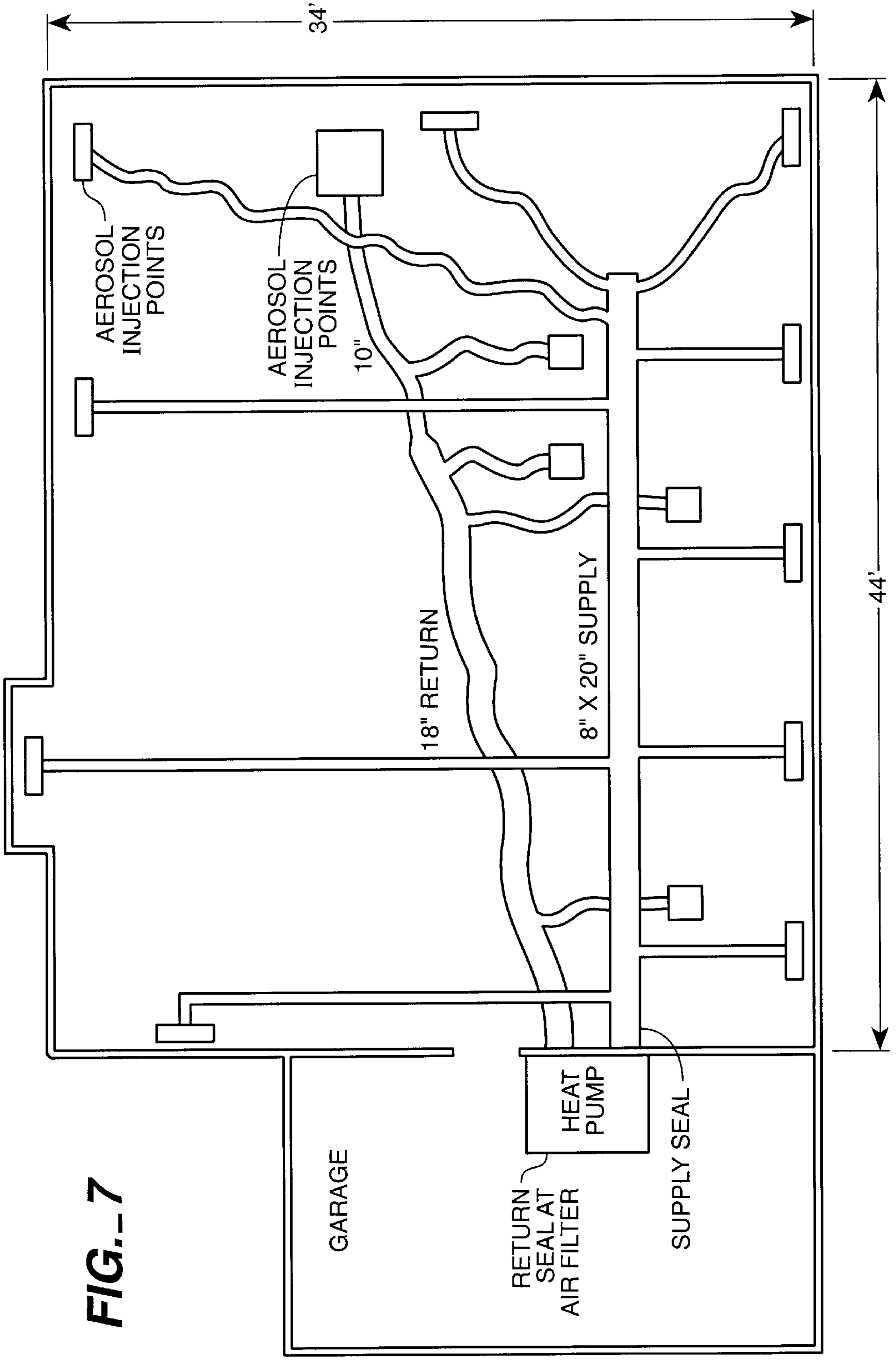
FIG._7

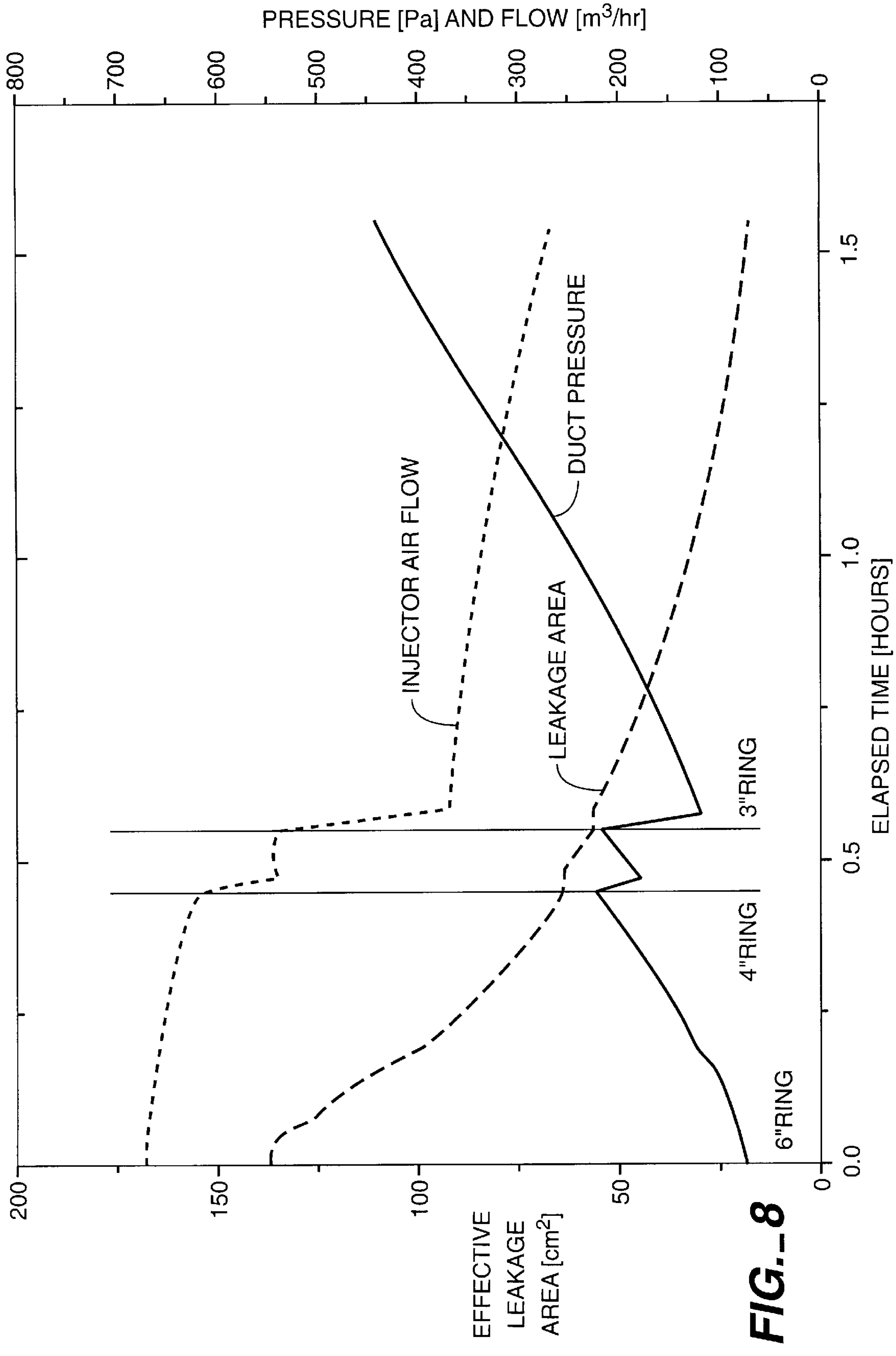
FIG._8

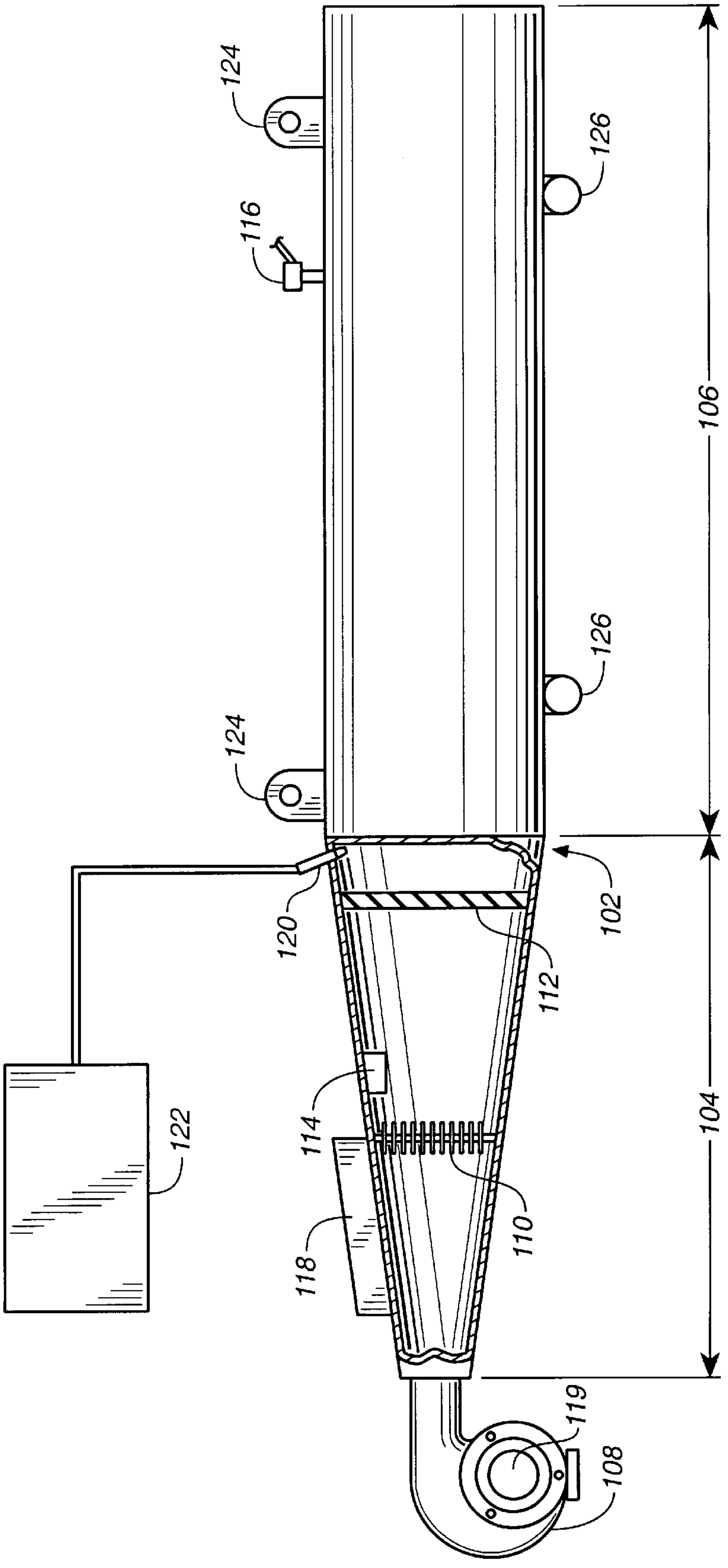
FIG._9

METHOD FOR SEALING REMOTE LEAKS IN AN ENCLOSURE USING AN AEROSOL

This is a continuation of application Ser. No. 08/554,170 filed on Nov. 6, 1995, now abandoned which is a continuation in part of Ser. No. 08/333,980 filed on Nov. 4, 1994, issued as U.S. Pat. No. 5,522,930.

The invention described herein was made with Government support under Contract No. DE-AC03-76SFOO098 between the U.S. Department of Energy and the University of California for operation of Lawrence Berkeley National Laboratory. The Government retains certain rights in this invention.

FIELD OF THE INVENTION

The present invention relates to a method and device for producing and delivering an aerosol for remote sealing and coating. More specifically the invention relates to sealing leaks from the inside of enclosures or applying an even coating to the inside surface of those enclosures remotely by means of injecting an aerosol into the enclosure to be sealed.

BACKGROUND OF THE INVENTION

There is a substantial need for methods of remote sealing and coating. Research has shown that the energy savings potential of sealing duct leaks is on the order of 20% of the furnace or air conditioner energy use (Modera, M. P. (1993 *Energy and Buildings,* 20:65–75). During the past five years, research has quantified the impacts of residential duct system leakage on HVAC energy consumption and peak electricity demand. A typical California house with ducts located in the attic or crawlspace wastes approximately 20% of heating and cooling energy through leaks and draws approximately 0.5 kW more electricity during peak cooling periods. Besides, given that 25% to 75% of the leaks are not accessible, conventional technologies such as using duct tape or mastic are often not satisfactory. Existing remote sealing technologies have been examined (e.g. introducing a rolling mechanical cart, or unfolding a cylinder in the duct network). Although the application of these techniques might be of interest for some pipe networks (the cart was patented and used for gas pipes and the unfolding cylinder is used to seal large underground pipes), the complexity of a residential duct system does not allow straightforward application of these technologies.

Encapsulants for duct systems have been previously disclosed and some of those have been applied by introducing a fog into the duct system.

Shinno teaches sealing and coating a pipe through the application of a mist to the interior surface of the pipe [U.S. Pat. No. 4,327,132 Method for Lining of Inner Surface of a Pipe (Apr. 27, 1982)]. This patent discusses the use of a multiple component epoxy based mist which is applied with a rapid air stream and then dried in place with the same rapid air stream. It also discusses the withdrawal and revival of residual paint exhausted from the pipe outlet. The Shinno patent calls for multiple gas flows, one to atomize the liquid to be applied and another to blow the mist down the pipe. Shinno also calls for mixture velocities of between 30 meters/second and 100 meters/second.

Koga teaches a method and apparatus for generating a plastic mist for deposition upon the interior surface of a pipe [U.S. Pat. No. 4,454,173 Method for Lining Pipes in a Pipeline (Jun. 12, 1984) and U.S. Pat. No. 4,454,174 Method for Lining Pipes of a Pipeline (Jun. 12, 1984)]. These patents confine themselves to the delivery of a plastic mist to the interior pipe surface. The Koga patents describe the use of a compressor and a vacuum generator to carry the mist through the pipeline. Additionally, these patents teach the use of low air pressure at one stage and high air pressure at another. In the Koga patent a heater is used to maintain the plastic in a liquid form.

Hyodo et al. teaches a method for sealing pipes which comprises feeding an aerosol type sealant into a pipe in the form of a foam [U.S. Pat. No. 4,768,561 Process for Sealing Pipes (Sep. 6, 1988)]. The sealant disclosed is one containing an aqueous resin selected from the group consisting of emulsions and latexes as a main component and being added with a propellant such as Freon 12/Freon 114.

SUMMARY OF THE INVENTION

The present invention is a method for remotely sealing and coating an enclosure from within. It allows for precise control of where the encapsulant material is deposited and is capable of effectively sealing leaks remotely from within an enclosure even where a complex network of bends, tees, and wyes is involved. Sealing efficiencies in the range of 0.5% to 3% and up have been found to be effective for sealing, in a reasonable amount of time with a reasonably high reduction in the effective leakage area (50% or greater, with 80 to 90% reductions being achievable in a reasonable amount of time).

A method according to the invention recites the use of aerosol sealants, the versatility of this technique deals with bends and bifurcations without significantly affecting their performance.

The method involves blowing an aerosol through an enclosure or duct system to seal the leaks from the inside, the principle being that the aerosol particles deposit in the cracks of the ductwork as they try to escape because of the pressure differential. The reader may find similarities between this intemal-access sealing and the aftermarket automotive sealants for tires although proper use of those sealants is rather restrictive (e.g. it requires the spinning of the tire after foam injection). One company was marketing a vinyl polymer suspension to immobilize dust in residential air-distribution systems. The company used a nozzle-produced jet to entrain air and generate an aerosol, and to blow the aerosol through the ducts. Filter paper was used in all the registers to block the fog from directly entering the house. The sealing effectiveness of this aerosol was tested for naturally occurring and for artificially created leaks in a duct system. Although the pressure driven flow of aerosol was a good vehicle for transporting the sealant through the system, the particles' size and type as well as the degree of control of pressure and flow rate were apparently inappropriate for sealing the typical leaks encountered. Thus, it appeared key to better understand aerosol transport in an ADS as well as particle deposition in the leaks.

An aerosol-based technique is used to significantly reduce the leakiness of residential air distribution systems (ADS). An aerosol made out of a liquid suspension of a vinyl polymer can plug 16 $cm^2$ of Effective Leakage Area in a branch of a residential duct system in less than 30 minutes. In a small scale duct system the Effective Leakage Area of a typical duct network can be reduced by about 80% in 15 minutes.

Using an aerosol to seal leaks from within an enclosure or to apply an even coating along the interior surface of an enclosure requires careful preparation of the aerosol and control of the flow through the enclosure. In the case of leak sealing, the pressure within the enclosure must also be controlled in order for the aerosol to find the leaks.

The present invention represents a dramatic breakthrough in the technology because it is capable of both remotely sealing and coating an enclosure from within. Not only useful for sealing and coating ducts and other enclosures, this technology is also applicable to filling voids in buildings and other cavities for increased structural integrity, sound proofing, and insulation. The sealing and coating method and device described in this application offer significant advantages over the conventional technology.

It is an object of the present invention to provide a method and device which capable of sealing a plurality of leaks from within an enclosure.

It is another object of the present invention to provide a method and device which can seal leaks without having to be directed towards specific openings.

It is a further object of the present invention to provide a device which can be easily transported.

It is a further object of the present invention to provide a device which is safe and easy to use, and provides documentation confirming the reduction in leakage area as the method according to the invention is utilized.

These and other objects and features of the invention will become fully apparent when the following detailed description of the invention is read in conjunction with the accompanying drawings.

BRIEF DESCRIPTION OF THE DRAWINGS

FIG. 1. is a schematic view of a experimental arrangement for use with a method according to the invention;

FIG. 2 is a graph of an example of Penetration efficiency plotted versus flowrate for various particle sizes;

FIG. 3 is a cross sectional visualization of the flow pattern in an enclosure and a characterization of variables to assess a method according to the invention;

FIG. 4 illustrates the side view of Type I leaks as assessed and sealed by a method according to the invention;

FIG. 5 is a side view of a duct joint showing a Type II leak the End view of which is shown in FIG. 6;

FIG. 6 is a cross sectional end view of a Type II annular leak in the joint between adjacent duct sections;

FIG. 7 is a plan view of a residential building whose ducts are illustrated as being sealed in Example 4, as discussed below;

FIG. 8 is a graph showing the ELA and pressure and flow with respect to time in Example 4 correspond to the duct system pictured in FIG. 7; and FIG. 9 is a cutaway side view of a device for implementing the method of the present invention.

Nomenclature

| | |
|---|---|
| $C_m$ | mass concentration of the aerosol [kg/m$^3$] |
| D | duct diameter [m] |
| d() | differential [–] |
| $d_p$ | particle diameter [m] |
| $\frac{dU}{dy}$ | velocity gradient of the approaching flow [s$^{-1}$] |
| e | duct wall thickness [m] |
| f | friction factor [–] |
| g | acceleration of gravity [m/s$^2$] |
| h | leak-width [m] |
| i | index [–] |
| L | duct length [m] |
| P | penetration efficiency [–] |

-continued

| | |
|---|---|
| Q | flow rate [m$^3$/s] |
| $Re_s$ | slot Reynolds number $\frac{v_s h}{v}$ [-] |
| $Re_D$ | duct Reynolds number $\frac{UD}{v}$ [-] |
| $Re_p$ | particle Reynolds number (based on relative velocity) [–] |
| s | particle-to-air density ratio [–] |
| SE | sealing efficiency [–] |
| Stk | Stokes number $\frac{\tau v_s}{y_s} = \frac{S\,Re}{18}\left(\frac{d_p}{h}\right)^2\sqrt{\frac{\alpha}{2}}$ [-] |
| t | time [s] |
| $t_i$ | i-th characteristic sealing time [s] |
| $t_{res}$ | residence time in the separation zone $t_{res} \sim \frac{y_s}{v_s}$ [s] |
| U | average velocity in the duct [m/s] |
| $U_S$ | velocity upstream of the slot at $y = y_s$ [m/s] |
| u | velocity along x [m/s] |
| $\vec{u}$ | velocity vector [m/s] |
| $V_d$ | turbulent diffusion velocity [m/s] |
| $V_e$ | effective mean deposition velocity at the wall [m/s] |
| $V_g$ | gravitational settling velocity $V_g = \tau g$ [m/s] |
| $V^*$ | dimensionless deposition velocity [–] |
| v | velocity along y [m/s] |
| $v_r$ | radial velocity of the particle [m/s] |
| $v_s$ | bulk velocity through the slot $\sqrt{\frac{1}{C_p}\frac{2\Delta P}{\rho_f}}$ [m/s] |
| w | thickness of the seal [m] |
| $w_r$ | relative velocity of the particle $w_r = \lVert\vec{u}_p - \vec{u}_j\rVert$ [m/s] |
| x | horizontal coordinate [m] |
| y | vertical coordinate [m] |
| $y_s$ | height of the dividing suction streamline [m] |
| | Greek symbols: |
| α | dimensionless velocity gradient of the approaching flow $\frac{h}{v_s}\frac{dU}{dy}$ [-] |
| | α |
| ΔP | pressure differential across the slot [Pa] |
| γ | angle [rd] |
| η | deposition efficiency [–] |
| ν | kinematic viscosity of the fluid of interest [m$^2$/s] |
| ρ | density [kg/m$^3$] |
| τ | particle relaxation time [s] |
| τ. | dimensionless particle relaxation time [–] |
| | Subscripts and superscripts: |
| f | pertaining to the fluid of interest |
| 0 | at t = 0, at the beginning of the experiment |
| D | pertaining to duct |
| p | pertaining to particle |
| ref | at the reference pressure differential |
| s | pertaining to slot |
| seal | pertaining to particle build up |
| — | average value |
| * | dimensionless quantities |
| | Abbreviations: |
| ADS | Air Distribution System |
| ELA | Effective Leakage Area [m$^2$] |

DETAILED DESCRIPTION

The present invention is a method and device for the remote sealing and/or coating of a structure from within. Specifically the invention includes a method for preparing, transporting, and remotely depositing an aerosol along the interior surface of an enclosure and/or depositing the aerosol in any leaks or openings in that enclosure so as to seal those leaks or openings. The invention also includes a device capable of performing the method.

The Method

There are four steps to the general method of the present invention. First, an aerosol is prepared (for example from a liquid suspended solid). Second, a carrier flow is generated. Third, the aerosol is introduced into the carrier flow. Fourth, the aerosol laden carrier flow is used to pressurize the enclosure to be sealed.

The most critical aspect of preparing the aerosol for the subject invention is that it must be appropriately sized and substantially solidified prior to reaching the leaks to be sealed. The aerosol must be sized small enough to travel to the leaks prior to leaving the carrier flow through gravitational settling and be large enough to leave the air stream and deposit along the leak boundaries once the leak is reached. When used for sealing, the particles must be sticky and they must substantially hold their shape so that they can build up on one another when they impinge upon the interior surface of the enclosure.

In one embodiment of the present invention, this preparation is accomplished by either 1) drying the air prior to the injection of a liquid-suspended solid aerosol or 2) heating the incoming airflow prior to aerosol injection. When using a liquid base for the sealant aerosol, two means for the controlling the size of the aerosol particles are the type of injection nozzle used and the degree of dilution of the liquid suspension. Alternatively, it is possible that a solid phase aerosol could be used directly.

The most important variables affecting the transport and deposition of the aerosol are, the duct (i.e., enclosure) flow rate, the size of the particle, and the duct pressure. All three variables affect the rate and efficiency with which sealing and coating occur. They also determine how far down the duct (or pipe) a particle will travel prior to gravitational settling.

These variables can be calculated once a particular sealing efficiency has been chosen. Sealing efficiency is the product of penetration efficiency (P) and the deposition efficiency (η).

$$SE=[\text{Sealing efficiency}]=(P)(\eta)$$

For duct Reynolds numbers below 2300 (laminar flow regime), we use the following equation to assess aerosol penetration efficiency in the network:

$$P=\frac{2}{\pi}\left(\gamma-\frac{\sin 2\gamma}{2}\right);\ \text{where } \gamma=\frac{\pi}{2}-\arcsin\left(\frac{\tau gL}{UD}\right)$$

For duct Reynolds numbers greater than 2300, calculations can be performed using the experimentally-derived correlations (see Anand, N. K. and Mc Farland, A. R. *American Industrial Hygiene Association,* 50: 307–312) to determine the turbulent diffusion velocity ($V_d$):

$$V_d = V_* U\sqrt{f/2}$$

$$V_* = 6.9\times 10^{-4}\tau_*^2 \quad \text{if } \tau_* \le 15$$

$$V_* = 0.16/\tau_*^{0.086} \quad \text{if } \tau_* > 15$$

$$\tau_* = \frac{\tau U}{D} f Re_D$$

and the friction factor $f$ is given by the Blasius equation:

$$f=\frac{0.316}{4\ Re_D^{0.25}}$$

The effective mean deposition velocity ($V_e$) can be assessed analytically:

$$V_e=\begin{cases}\frac{1}{2\pi}[(\pi+2\gamma)V_d+2V_g\cos\gamma] & \text{if } V_d<V_g,\ \gamma=\arcsin\left(\frac{V_d}{V_g}\right)\\ V_d & \text{if } V_d\ge V_g\end{cases}$$

and can be used to assess the penetration efficiency of the aerosol for appropriate duct Reynolds numbers:

$$P=\exp\left(-\frac{4V_eL}{UD}\right)=\exp\left(-\frac{4V_eL}{\nu Re_D}\right)$$

From the point of view of coating, the greater the turbulent diffusion velocity ($V_d$) as compared to the gravitational settling velocity ($V_g$), the more even particle deposition is in a cross-section of the duct of interest.

As for the deposition efficiency (η), in the case of particle deposition in a two-dimensional slot from a transverse stream (which is representative of the deposition phenomenon that occurs in many leaks encountered in air-distribution systems and can be used to approximate sealing of annular joint leaks and circular holes), it may be determined as follows:

$$\eta\sim\frac{\tau v_s^2}{y_s}\frac{e}{v_s h}=\frac{\tau v_s}{y_s}\frac{e}{h}=Stk\frac{e}{h}$$

where the symbols are listed in the Nomenclature and $v_s$ and $y_s$ can be calculated with the following equations:

$$v_s=0.6\sqrt{\frac{2\Delta P}{\rho_f}}$$

$$y_s=D\sqrt{50.63\frac{Re_s}{Re_D^{\frac{7}{4}}}}$$

The theoretical limits of such an analysis are approximated by the following:

$$Re_p\sim Stk\frac{v_s d_p}{\nu}<<1$$

$$Stk\sim\frac{\tau}{t_{res}}<<1$$

-continued $$\frac{\tau v_s}{e} >> 1$$

The sealing mechanism for annular duct joint (i.e, Type II whose particulars are described below in discussing FIGS. 4, 5, and 6) leaks is similar that for two dimensional slots, however the thickness of the seal is not twice the thickness of the enclosure wall. Rather than using a separate equation for such leaks, and then trying to estimate what fraction of each type of leak occurs, the method makes use of experimentation according to the invention which has shown that the sealing time for such leaks is comparable to that for two dimensional slots of the same characteristic dimension.

We further assumed that the only geometric parameter that varies as impaction occurs is the slot-width. Thus if the aerosol is monodisperse (or in general, if the mean deposition efficiency ($\bar{\eta}$) can be evaluated over the particle size range) and if the sticking probability of the aerosol is 1 (ideal case), the rate at which the leak width decreases is:

$$-\frac{dh}{dt} = \bar{\eta} \times \frac{h}{\rho_{seal} w} \times v_s \times C_m$$

A comparison of observed and theoretical leak sealing found good agreement for low pressure differentials ($\Delta P \leqq 60$ Pascals). The simplified calculation described above approximates key parameters that will affect the sealing time. Given a two dimensional slot at a distance L from where the concentration $C_m$ is measured, the leak-width decrease rate is given by equation above where the right hand side is multiplied by the aerosol penetration efficiency P over the distance L. On this basis as recited above, the sealing efficiency is defined as:

$$SE = \bar{\eta} \times P$$

The decrease of the width of a two-dimensional slot in such a configuration can be easily computed by integrating the following equation:

$$-\frac{dh}{dt} = [SE] \times \frac{h}{\rho_p e} \times v_s \times C_m$$

and gives us critical information as regards the sealing time. Also, the time required to obtain a slot width decrease of $$\frac{1}{i} h_0$$

(i-th characteristic time, $t_i$) appeared to be an interesting indicator of the sealing effectiveness. Assuming that the sealing efficiency computed by $SE = \bar{\eta} \times P$ remains constant within that time frame we obtain:

$$t_i = \frac{\rho_p e}{SE \times v_s \times C_m} \times \ln\left(\frac{i}{i-1}\right)$$

where $v_s$ and $y_s$ (that are needed to compute SE) can be approximated with the equations for $v_s$ and $y_s$ shown above and the variation of SE over $t_i$ is:

$$\frac{\Delta SE}{SE} = \left(\frac{i}{i-1}\right)^{\frac{3}{2}} - 1$$

Obviously this i-th characteristic time is all the more realistic as i is sufficiently large so as to ensure that SE is constant over $t_i$ $$\left(\text{for } i = 2,\ \frac{\Delta SE}{SE} = 1.83;\ \text{for } i = 20,\ \frac{\Delta SE}{SE} = 0.08\right).$$

Calculations to assess the sealing efficiency SE and the i-th characteristic time can be performed with the help of a spreadsheet program (see Table 1).

Table 1; Sample calculations of the penetration, the sealing efficiency, and the i-th characteristic sealing time (D=0.15 m; L=10 m; h=3 mm; e=0.6 mm; ΔP=40

| Flow Rate [m³/h] | Penetration efficiency [—](in %) | Sealing Efficiency [—](in %) | $t_2$ [s] | $t_{20}$ [s] |
|---|---|---|---|---|
| 14.6 | 32.7 | 0.3 | 6558 | 485 |
| 29.3 | 57.2 | 0.8 | 2046 | 151 |
| 43.9 | 68.9 | 1.4 | 1191 | 88 |
| 58.5 | 75.6 | 2.0 | 844 | 62 |
| 73.2 | 80.0 | 2.6 | 656 | 49 |
| 87.8 | 83.0 | 3.1 | 539 | 40 |
| 102.4 | 85.2 | 3.7 | 459 | 34 |
| 117.1 | 86.9 | 4.2 | 401 | 30 |
| 131.7 | 88.2 | 4.8 | 356 | 26 |
| 146.3 | 89.2 | 5.3 | 321 | 24 |

An issue to understand is how particles transported to each leak site are deposited there to stick to the duct wall and eventually "build a bridge" over the leak between each leaks boundaries. Vinyl plastic particles seem to achieve this goal since they are widely used to adhere to smooth and waterproof surfaces. The particles must hold their shape in order to "build a bridge." If the particles are too deformable, they will tend to run or spread over the duct wall preventing particle build up.

By drying the aerosol we can obtain solid particles that stick to the duct wall and to one another. These particle build-up to decrease the leak size.

An apparatus described in FIG. 1 supplies the aerosol to a duct system and evaluates the performance of a method according to the invention. It includes: 1) a desiccant drying section, 2) a vane-anemometer flow measurement device, 3) an assortment of commercially available sprayers, 4) a peristaltic pump to control and measure the liquid flow rate to the spray nozzle, 5) a sampling unit to measure aerosol concentration, 6) a mass-flow controller network to ensure isokinetic sampling, and 7) precisely constructed Type-I and Type-II leaks in a leak section 7. Other pictured devices are: a damper 8, a fan 9, a mass flow meter 10, a pressure tank 11, an in-line heater 12, a compressed air connection 13, an injection chamber 14, a 15 cm diameter duct; a filter 16, a series of leakage slots 17, a pump 18, a thermocouple 19, a temperature controller 20, and a relative humidity sensor 21. The data from all of the measurement devices described in FIG. 1 is sent to an IBM-PC and stored electronically.

Using this apparatus, Type-I leaks as large as 3 mm in diameter could be sealed in 10–20 minutes and 3 mm Type-II leaks were partly sealed during the same experiments. These results were repeatable were obtained in a two-branch duct network as well.

To quantify sealing effectiveness, the permeability of the network before and after injection of the aerosol was measured. The Effective Leakage Area (ELA) commonly employed to measure the leakiness of a building envelope or an ADS was used. The equation linking the leakage flow rate to the pressure differential is given by:

$$Q = ELA\sqrt{\frac{2\Delta P_{ref}}{\rho_f}}\left(\frac{\Delta P}{\Delta P_{ref}}\right)^n$$

Thus, by artificially creating a pressure differential in the test section and by measuring the leakage flow rate, one can calculate the ELA. The physical meaning of the Effective Leakage Area is that, at the reference pressure differential, the flow rate passing through the leaks would be the same as that leaking through a sharp-edged orifice of this same area under the same pressure differential. The reference pressure differential is usually set to 4 Pascals in building science applications in the U.S., which is typical of wind pressure and stack effect there. However, because the pressure differential across duct leaks is significantly higher than 4 Pa when the system is in operation, characterizing duct leaks at a reference pressure of 25 Pa is more appropriate. Therefore, the 25 Pa characterization is reasonably utilized. Precision errors are calculated with the following equation:

$$\frac{\delta ELA}{ELA} = \delta(\ln(Q_{ref}))$$

There are more than one set of flow rates, particle sizes and duct pressures that will satisfy the requirement of a given sealing efficiency and an even coating. This same remark also applies to the set of flow rates, particle sizes, duct pressures and aerosol concentration that will satisfy the requirement of a given sealing time.

In the actual practice of the above described method the duct flow rate and the pressure within the duct must be maintained to minimize the loss of sealant material on to the walls of the duct. In practice the pressure and flow rate must be maintained above a minimum value.

For the present invention the solid aerosol particle can measure between 1–100 microns. It should be noted that non-spherical particles (e.g., fibers) with similar aerodynamic diameters could be substituted for spherical particles and may result in higher sealing efficiency as the length dimension of such fibrous particles may tend to span the leak opening. The fiber may be commercially purchased and act as dry particles in suspension or may be wet and sticky. To close leaks with fiber particles, the sealing procedures may include using or making the fibers themselves sticky and then injecting them in the enclosure, similar to spherical particles. Alternately, dry fibers can be injected with a sticky aerosol and to produce a coherent build-up mass at the leak sites. Alternatively the sticky aerosol can be alternated with fibers to create a several layers of sealing material around the leaks sites as long as there is sufficient leakage at the leak site to promote the transport of the particles whether spherical or fibrous to the leak site.

In its preferred range the particle size should measure between 2–40 microns in diameter with a most preferred range of between 3–15 microns in diameter. Flow rates can range from 20–20,000 cubic meters per hour and as previously explained, the adequacy of the choice of a given flow rate depends on other variables (among them, particle size, duct size, duct pressure). In residential duct work the preferred range for flow rates is between 100–5000 cubic meters per hour with a most preferred range of between 200–600 cubic meters per hour. In commercial duct work the preferred range for flow rate is between 500–5000 cubic meters per hour. There is an upper limit on the pressure established by the structural integrity of the enclosure to be sealed.

With regards to sealing leaks, particle deposition is achieved by "building up a bridge," between t he boundaries formed by a leak in th e enclosure. In one embodiment, the particulate sealant material is suspended in a liquid base. A solid phase aerosol is formed by removing the liquid during the aerosol injection. One example of a suitable material is to suspend vinyl plastics in water for use as an aerosol. Specifically, an aerosol is generated from a liquid suspension of an acetate-acrylate vinyl polymer and then dried in order to obtain solid sticky particles. Regardless of the material chosen, it is critical that the particles retain their shape on impact with the leak boundaries. If the particles are too deformable, they will tend to spread over the leak boundaries preventing any particle build up spanning the leaks.

The preparation of the enclosure to be sealed typically includes closing intentional openings in the enclosure. For example, the vents in a heating system would be closed. Another possible step in the preparation of the enclosure would be the introduction of bag filters to keep up the velocity within the system. In the real world it would also be necessary to isolate any objects within the enclosure that might be sensitive to coating.

In the sealing application, closing intentional openings and using a gas as the carrier makes it possible for the invention to provide immediate feedback on the air-tightness of the enclosure being sealed. This is accomplished by monitoring the carrier flow and the enclosure pressure during the sealing process.

General Coating Concept

By means of the knowledge disclosed in this application, aerosol injection can be optimized to coat the inside of enclosures rather than buildup preferentially at the leaks in those enclosures. This is accomplished by operating in a regime of aerosol transport th at is turbulent-diffusion dominated, and does not require the use of "limited-slip" particles (i.e., particles that will build-up). This can be understood by examining the equations for penetration efficiency, P, and deposition velocity, $V_{e'}$. The deposition velocity is made up of two components, the gravitational settling velocity, Vg, and the turbulent diffusion velocity, $V_d$. As the air flowrate is increased, the velocity and Reynolds number of the flow through the enclosure is increased, which increases the turbulent diffusion velocity, $V_d$. By increasing the turbulent diffusion velocity, wall deposition becomes dominated by turbulent diffusion, and therefore becomes uniform. By contrast, at low flowrates (i.e., velocities and Reynolds numbers) wall deposition occurs principally by means of gravitational settling, and therefore is concentrated at the bottom of the enclosure.

In addition, because the aerosol does not need to span any gaps for the coating application, the constraint that the particles be "limited-slip" (i.e., that they do not flow appreciably after contact) is relaxed. In fact, some particle flow is beneficial in this application, as it will result in a more uniform coating.

FIG. 2 illustrates the regimes of operation for the particular application of an air duct. At low air flow rates the removal of particles from the airstream occurs principally by gravitational settling, which results in deposition on the bottom of the duct, and therefore a low penetration. As the air flow is increased, the wall deposition is decreased due to the fact that the particles are moving more quickly through the duct, and therefore travel further before falling to the bottom, corresponding to a high penetration. To preferentially deposit particles at the leaks, particle sizes and flowrates that maximize enclosure penetration efficiency while maintaining a reasonable deposition efficiency are chosen. As the air flow rate is increased further, the removal at walls begins to increase due to the increase in turbulent diffusion to the walls at higher Reynolds numbers, resulting once again in a low penetration. It is this third regime that results in relatively uniform coating on the interior walls of the duct.

FIG. 3 provides a conceptualized visualization of the flow regime around a Type I leak. The variable pictured relate to conceptualized physical parameters as shown.

FIG. 4 shows an elevational view of idealized leak holes in the side of a duct which are considered Type I leaks. A vertical slot, a horizontal slot, and a circular configuration are shown in the side of a duct section.

FIGS. 5 and 6 show the side and cross sectional views of a Type II leak which is an annular opening in the transition between adjacent duct sections.

FIG. 7 shows a plan view of a duct plan for a residential building where the method according to the invention was utilized for sealing.

FIG. 8 shows a graph comparing elapsed time and Effective Leakage Area, pressure in the duct and the injection flow rate into the duct. The plot of the Effective Leakage Area (the back calculated leakage area from the known flow rate and pressure differential), is particular to each duct system. The plot of the Effective Leakage Area versus time documents a large reduction in the leakage area. In the graph shown there is a decrease from approximately 137 $cm^2$ at the start to approximately 20 $cm^2$ at the end of the graph an approximately 87% reduction in the Effective Leakage Area. The Pressure and flow curves include discontinuities at vertical lines labelled 4" RING and 3" RING. These discontinuities result from a change in the air flow control and/or measurement inlet orifices. Initially when there is a large flow into the enclosure a 6" ring was used to control and measure flow into the enclosure. As the leakage was decreased, the continuous injection of air flow caused the pressure to rise. To reduce the pressure and the flow first a 4" ring was substituted for the 6" ring orifice and then later a 3" ring orifice was substituted for the 4" ring to maintain flow parameters within parameters according to the method of the invention which continue to deliver sealing particles to the location of the leaks while simultaneously avoiding over pressurizing the enclosure. The reduction in Effective Leakage Area over 1 to 1.5 hours provides substantial sealing of the duct system such that further sealing is not likely to have substantial benefit except under unusual circumstances (e.g., hospitals where germ isolation is required). The time history of the Leakage reduction provides documentation of the sealing process. Documentation of leakage area reduction can be presented to third party auditors to quantify the effectiveness of sealing and subsequent energy saving as a result of using the particles to seal remote leaks. The ELA curve will be different for different duct system, even duct systems which are ostensibly constructed identically. Monitoring of the number of different curves will confirm the number of ducts which have been sealed. Identical curves have a very low probability of occurring.

A Device

One aspect of the present invention is a device for carrying out the method described above. FIG. 9 illustrates one embodiment of the present invention. The device is made up of a primary body 102 being comprised of a hollow structure divided into a preparation end 104 and a delivery end 106. In one embodiment the primary body 102 is cylindrical in shape with the preparation end 104 tapering into a truncated cone.

A fan 108 is connected to the preparation end 104 of the primary body 102. The fan 108 produces an airflow through the hollow portion of the primary body 102 and exits at the delivery end 106 of the primary body 102. The air flow produced is the carrier flow into which the solid phase aerosol will be injected and the used to pressurize the enclosure to be sealed. An airheater 110 placed between the fan 108 and the delivery end 106 of the primary body 102 heats the incoming airflow. In another embodiment the use of a desiccant could be substituted for the heater 110. A filter 112 is fitted between the airheater 110 and the delivery end 106 of the primary body 102 to reduce any particulate impurities prior to injecting the aerosol and insure that aerosol particles do not come in contact with the heater 110.

A thermostat 114 is located within the primary body 102. A pressure switch 116 is located within the primary body 102. In the present embodiment the switch 116 is located in the delivery end 106 of the primary body 102. A control mechanism 118 connecting the fan 108, pressure switch 116, airheater 110, and thermostat 114 in conjunction with those parts controls the temperature and velocity of the carrier flow.

A flow measurement sensor 19 is connected to the inlet of the fan 108. In one embodiment, the pressure difference across an orifice plate is measured with a pressure transducer. The flow through the unit is proportional to the square root of the pressure differential across the orifice plate.

An injection nozzle 120 is set into the primary body 102 between the filter 112 and the delivery end 106 of the primary body 102. A liquid suspension of aerosol is delivered to the injection nozzle 120 from an aerosol source 122. In one embodiment the aerosol source 122 is comprised of an air compressor, a pressure regulator, and a liquid storage tank. If a dry aerosol source is used, the heater 110 can be eliminated.

A pair of handles 124 are attached to the primary body 102 of the device to aid with transportation and handling of the device. Additionally, a set of feet 126 are attached to the bottom of the primary body 102 to stabilize the unit and aid in positioning the device.

In actual use the delivery end 106 is connected to an opening in the enclosure to be sealed. The fan 108 generates a carrier flow which is pulled through the flow measurement sensor 19, heated by the airheater 110, and then passed through the filter 112 to remove impurities. Aerosol is injected from the aerosol source 122 through the injection nozzle 120 into the preparation end 104 of the device. The aerosol is carried by the carrier flow generated by the fan 108 and out the delivery end 106 of the device. The liquid in the aerosol evaporates off and the carrier flow with the remaining solid phase aerosol is used to pressurize the enclosure to be sealed.

The pressure differential between the interior of the enclosure and the outside atmosphere causes the particles of the solid phase aerosol to find the leaks in the enclosure. When the aerosol impinges on the interior boundaries of the leaks, it sticks where it makes contact. Through this process a "bridge" is built up between the boundaries formed by a leak in the enclosure.

As leaks are sealed the pressure in the enclosure rises. The rise in pressure acts as feed back to the device and the pressure switch 116 in conjunction with the control mechanism 118 turns off the device once pressure reaches a level indicating that the leaks are sealed.

To Design a Device for a Specific Application

Before starting, identify or estimate the following information and/or data:

1) the overall leakage area to be sealed (i.e., the net area of all the holes in the enclosure),
2) characteristic dimension of the leaks (approximately half of the smallest dimension of the average leak or the hydraulic radius of the average leak (area/perimeter),
3) characteristic thickness of the seals (the aerosol matter deposited in the leak) (~2×enclosure wall thickness)
4) characteristic distance between the aerosol injection point and the leakage sites (i.e., how far away are the leaks),
5) characteristic cross-section of the enclosure between the injection point and the leaks,
6) any time constraint associated with the sealing process,
7) any material deposition constraints for the inside of the enclosure,
8) any limitations on particle size,
9) any limitations on availability of electrical power,
10) any limitations on the pressure to which the enclosure can be submitted,
11) any constraints on the simplicity of the sealing procedure (e.g. no calculations or adjustments between different applications).

Example Application: Residential Duct Systems

Several constraints for applying this sealing technology to residential ductwork are:

1) limitations on the aerosol-injection-time required for sealing >80% of the leakage (<1–2 hours),
2) limitations on the quantity of material deposited on the duct walls (e.g. <0.001 mm average coating of the duct walls),
3) ability to substantially seal leaks as large as 6 mm across within 1.5 hour period,
4) limitations on the electrical power readily available,
5) limitations on the level of adjustment required on a house-by-house basis (i.e., rather not change particle size, rather not have to adjust flowrate, except rarely), and
6) little or no aerosol particle injection into the house.

Using the method according to the invention to meet the constraints:

Constraint 1 can be met by assuring that 80% of the characteristic size leaks will be sealed within 1 hour at the chosen material injection rate.

Constraint 2 can be met by assuring that the product of the average penetration efficiency (P), the aerosol material injection rate ($Q_{aero}$), and the injection time (t) results in an average coating thickness on the order of 0.001 mm.

Constraint 3 can be met by assuring that the sealing efficiency of a 6 mm leak is such that it is substantially sealed within 1.5 hours, at the chosen material injection rate.

Constraint 4 is a practical constraint that could be relaxed, but which was chosen to be that the sealing equipment should use no more than two 15-amp circuits.

Constraint 5 is met by designing the apparatus and particle size to meet the extremes of the first four constraints, and thereby be able to address all easier situations, for example by using a fan that does not drop its flowrate dramatically as the duct pressure rises during the sealing process (or a fan that is automatically controlled).

Constraint 6 can be met by sealing all of the registers in the duct system, or by covering the registers with filters that effectively capture the size particles being generated.

Example Apparatus/Procedure Design Process

Starting with Constraint 4, if we chose to use an aerosol material suspended in a solvent, for example Duct Seal, manufactured by Puma Technologies in Ft. Worth, Tex. (an acetate acrylate vinyl polymer suspended in water), then in order to assure that the particles are adequately dried (i.e., brought to a solid or substantially non-deformable sticky state) prior to injection into the duct system, or at least before they encounter leakage sites, the air must be heated and/or dried. The practical limitation is that this process cannot use more than ~2500 W, which thereby limits the liquid injection rate and therefore the aerosol particle injection rate. For example, if the aerosol-material/solvent solution is 17.5% solids (e.g., Duct-Seal diluted 1 part water to 1 part shipped product) then 2500 W would be able to evaporate 76 cc/min of diluted solution. (It should be noted that the dilution of the solution is used to control the particle size.) The other limitation is that mixing is not perfect, and we want most of the evaporation to occur prior to injection into the duct system (e.g., within about 10 feet). Therefore, it is more practical to reduce the maximum liquid flowrate by about a factor of two which provides a safety cushion such that the air does not locally reach saturation. In this case, 40 cc/min of aerosol solution results in 7 cc/min of sealant material being injected into the system.

Given the above constraint on material injection rate, the product of sealing efficiency, injection time and material injection rate needs to be equal to or greater than the volume of material that needs to be deposited in the leaks. Thus, given that a typical duct-wall thickness of 0.25 mm corresponds to a seal thickness of approximately 0.5 mm to seal a typical duct-system leakage area of 150 $cm^2$ of effective leakage area, which corresponds to a physical area of $150/0.6=250\ cm^2$, 12.5 cc of aerosol material needs to be deposited. To deposit 12.5 cc of material in 60 minutes at an injection rate of 7 cc/min implies that the sealing efficiency must be at least $12.5/(7*60)=0.03=3\%$. This assumes that we have completely blocked all of the registers in the duct system so that all of the flow is going through the leaks.

As we now know the solid-material injection rate to be ~7 cc/min, and the sealing time to be ~1 hour, Constraint 2 dictates that the penetration efficiency should be greater than $1-(40\ m^2\times0.001/1000\ m)/(7\ cc/min1\times10^6\ cc/m^3\times60\ min)\times100=90\%$. A typical duct-system surface area is 40 $m^2$ (corresponding to 25% of a typical house floor area of 160 $m^2$ (1700 $ft^2$)).

Thus, if the penetration efficiency must be on the order of 90% and sealing efficiency on the order of 3%, then the average deposition efficiency must be slightly greater than 3%. It should be noted that there could be some trade-off between penetration efficiency and sealing efficiency, as the average thickness of wall deposits is not a hard constraint. It should also be noted that the problem does not lend itself to a closed-form solution, but rather is typically solved iteratively by means of the relationships developed for penetration and sealing efficiency.

To meet the desired average penetration efficiency, we have to accommodate the average length of the ductwork and the average diameter of the ductwork, which for a residential system are on the order of 6 meters and 0.15–0.2 m respectively. Also, as will be seen below, the particle size is constrained by our requirements on the deposition efficiency. The penetration efficiency constraint is therefore used principally to define the flowrate through the duct system, by means of its impact on $Re_D$, or in other words the average velocity through the duct system (it should noted that far more sophisticated techniques can be employed for optimizing the flowrates and particle sizes, however such optimizations are generally not necessary, and are outside the scope of this example). The average velocity of the duct system is related to the flowrate through the system by means of the average cross-sectional area of the duct system. For a typical residential duct system, the cross sectional area ranges from 0.2 to 0.3 $m^2$ depending on the size of the system and whether the supply and return sides are sealed simultaneously. For an average diameter of 0.15 m, a typical length of 6 meters, and a cross-section of 0.2 $m^2$, the required fan flowrates to achieve approximately 90% penetration efficiency are, as a function of particle size:

| Solid Particle Size [μm] | Liquid Particle Size at 0.175 solids ratio [μm] | Penetration efficiency [—] | Average Velocity [m/s] | Flowrate [$m^3$/h] |
|---|---|---|---|---|
| 3 | 5 | 0.94 | 0.23 | 166 |
| 5 | 9 | 0.92 | 0.46 | 331 |
| 6 | 11 | 0.92 | 0.69 | 497 |
| 7 | 13 | 0.90 | 0.69 | 497 |
| 8 | 14 | 0.90 | 0.92 | 662 |
| 10 | 18 | 0.89 | 1.61 | 1162 |

In the table above, the second column represents the size particles than can be generated by a sprayer when using a solution with a 0.175 solids ratio when trying to create the particle sizes in column 1. Considering the size and power limitations associated with residential applications, it seems clear that we would like to generate particles smaller than 10 μm, or else relax our wall deposition constraints, as an 1162 $m^3$/h fan that can operate at the required pressure differentials for sealed register applications is rather expensive and impractical. Also, the penetration efficiencies were calculated using the equations cited above along with standard equations for $V_g$ (=gτ) and τ(=$d_p^2\rho/18\nu$) based on particle size (N. A. Fuchs, The Mechanics of Aerosols, 1989).

To meet the desired average deposition efficiency, $\tau v_s e/y_s h$ must be greater than 0.033 on average. In the simplest approach to this problem h can be estimated as one half the average characteristic dimension of the leaks, or approximately 1.6 mm, e is the thickness of the seal at the duct wall, or approximately 0.5 mm. $y_s$, which is the height of the streamline below which all of the aerosol-laden air goes through the leak, can be arrived at from continuity (conservation of mass), or in other word, simply by noting that the mass flow below the dividing streamline must be equal to the air flow through the leak. Using the standard Blasius equations for the boundary layer near the wall of the duct, and approximating the flow through the leak with standard orifice equations (so $v_s$=0.6*sqrt(2*ΔP/$\rho_f$), $y_s$ can be calculated as=7.115 D*sqrt(Re/$Re_D^{7/4}$). As e and h cannot be influenced by our design, the only variables that can be influenced are τ, which is a function principally of particle size, but also of particle density, U (which is the bulk flowrate through the duct), and ΔP (the pressure differential across the leaks). As U was determined principally by the constraints on P, and the average pressure in the duct system during the sealing process is determined by the constraints on U combined with the fact that the registers are sealed, the key parameter of interest with respect to deposition efficiency is the particle size.

Concerning the pressure differential, the practical consideration of maintaining the penetration efficiency while all of the air is directed to the leaks (by sealing the registers) so as to decrease sealing time and minimize wall deposition, dictates that the pressure differential will steadily rise as the sealing process proceeds. Thus, all that remains is to define a minimum pressure differential. Once again, this parameter is constrained by the fact that moving the required quantity of air through the duct system results in some pressure drop within the duct work. Based upon these practical considerations, and the fact that the deposition efficiency drops off at lower pressures, a minimum pressure differential of 10 Pa is specified. Simple calculations based upon the known leakage characteristics of duct systems, and the fact that we want to seal >80% of the leakage, imply that the typical average pressure across the leaks is on the order of 200 Pa. Thus, the deposition efficiency is calculated for several particle sizes as:

| e [mm] | h [mm] | ΔP [Pa] | $d_p$ [μm] | U [m/s] | η [%] |
|---|---|---|---|---|---|
| 0.5 | 1.6 | 10 | 3 | 0.23 | 0.1 |
| 0.5 | 1.6 | 40 | 3 | 0.23 | 0.15 |
| 0.5 | 1.6 | 200 | 3 | 0.23 | 0.23 |
| 0.5 | 1.6 | 200 | 5 | 0.46 | 1.2 |
| 0.5 | 1.6 | 200 | 6 | 0.69 | 2.4 |
| 0.5 | 1.6 | 200 | 7 | 0.69 | 3.2 |
| 0.5 | 1.6 | 200 | 8 | 0.92 | 5.4 |
| 0.5 | 1.6 | 200 | 10 | 1.61 | 14.0 |

Constraint 3 remains to be checked, namely that a 6 mm leak needs to be substantially sealed within 1–1.5 hours. This can be checked using the i-th characteristic time concept to assure that a perfectly machined 6 mm leak is 50% sealed within 1–1.5 hours. The deposition-efficiency equation developed is for perfectly machined leaks. As the leaks in a residential duct system are by no means perfectly machined, the method makes use of the fact that the experiments have confirmed that such leaks with an edge roughness seal approximately twice as fast due to upstream edge flow separation and deposition (at least for large leaks (e.g., 6 mm)).Thus, assuring 50% sealing for perfectly machined leaks effectively insures substantially complete sealing of rough-edged leaks. For a 6 mm leak the 50% sealing time at a particle injection rate of 7 cc/min is as follows:

| ε [mm] | $d_p$ [μm] | Flowrate [$m^3$/h] | $t_{50\%}$ [s] |
|---|---|---|---|
| 0.5 | 8 | 663 | 2900 |
| 0.5 | 7 | 497 | 4200 |
| 0.5 | 6 | 497 | 5600 |

Thus, an apparatus generates 7 cc/min of particles in the range of 6–8 μm at air flow rates of 500–660 $m^3$/hr should meet all the constraints for a residential duct system.

EXAMPLE 1

Experiments were conducted using a device similar to the embodiment described herein—It has been found that use of the method and device of the present invention can seal 16 $cm^2$ Effective Leakage Area (ELA) in an enclosure in less than 30 minutes. The results in Table 1 provide a proof-of-concept of the of the sealing of an enclosure with aerosols. Table 1 illustrates typical results.

TABLE 2

ELA (at 25 Pa) Reduction After Aerosol Injection

| Experiment # | Initial Flow Rate [m3/h] | Ending Pressure [Pa] | Liquid Flow Rate [cc/min] | Duration [min] | ELA before Injection [$cm^2$] | Precision in initial ELA measurement (in %) | ELA Reduction (in %) |
|---|---|---|---|---|---|---|---|
| 1 | 40 | 60 | 5.7 | 50 | 16.4 | 3.0 | 34 |
| 2 | 70 | 96 | 10 | 25 | 16.4 | 3.0 | 18 |
| 3 | 60 | 135 | 6 | 20 | 16.4 | 3.0 | 84 |
| 4 | 50 | 210 | 5 | 30 | 16.4 | 3.0 | 95 |
| 5 | 50 | 205 | 5 | 30 | 16.4 | 3.0 | 82 |
| 6 | 40 | 210 | 410 | 30 | 16.4 | 3.04 | 94 |
| 7 | 40 | 209 | 4 | 30 | 16.4 | 3.0 | 94 |
| 8 | 30 | 18 | 3 | 30.4 | 16.4 | 3.0 | 29 |
| 9 | 60 | 105 | 6 | 30 | 16.4 | 3.0 | 94 |
| 10 | 40 | 10 | 4 | 30 | 36.1 | 2.4 | 37 |
| 11 | 50 | 15 | 5 | 30 | 26.3 | 2.7 | 42 |

In the Experiments(#) 1–11 summarized in Table 2, an in-line heater was used to lower the water content of the aerosol particles prior to aerosol injection.

From Table 2, it can be seen that the ELA of the enclosure can be reduced by more than 90% in 20 to 45 minutes. In addition, the initial air flow rate can be lowered down to 40 cubic meters/hour per branch and still provides sufficient aerosol penetration efficiency and significant ELA reduction (see experiments 6 and 7, above). According to our experiments, plugging an equivalent of 16 $cm^2$ will occur in about 30 minutes. Larger initial leaks require more time for sealing (see Experiments 10 and 11).

EXAMPLE 2

The graph shown in FIG. 2 illustrates Penetration efficiency as a function of flow rate and particle size. This example was carried out using the method of the present invention in a duct having a 15 cm diameter and a length of 10 meter. The ridge in the plots represents the conditions under which the turbulent diffusion velocity $V_d$ equals the gravitational settling velocity $V_g$ for a particular particles size.

EXAMPLE 3

Calculations to assess the $V_d/V_g$ ratio of the sealing effectiveness can be performed with the help of a spreadsheet program. Table 2 illustrates an example of such calculations for a duct having a 15 cm diameter and a length of 10 meters. We used a (h=3 mm; e=0.6 mm) slot to compute the sealing efficiency at 40 Pascals pressure differential.

TABLE 3

Calculation of the Penetration, the sealing efficiency, and the $V_d/V_g$ ratio

| Particle diameter [μm] | Flow Rate [$m^3$/h] | Penetration efficiency [—] | $V_d/V_g$ [—] | sealing efficiency [—] |
|---|---|---|---|---|
| 3 | 14.6 | 0.90 | 5.50 E − 08 | 0.06% |
| 3 | 29.3 | 0.95 | 1.10 E − 06 | 0.12% |
| 3 | 43.9 | 0.97 | 6.70 E − 06 | 0.18% |
| 3 | 58.5 | 0.97 | 2.40 E − 05 | 0.23% |
| 3 | 73.2 | 0.98 | 6.30 E − 05 | 0.28% |
| 3 | 87.8 | 0.98 | 1.40 E − 04 | 0.33% |
| 3 | 102.4 | 0.98 | 2.70 E − 04 | 0.38% |
| 5 | 14.6 | 0.76 | 1.50 E − 07 | 0.15% |

TABLE 3-continued

Calculation of the Penetration, the sealing efficiency, and the $V_d/V_g$ ratio

| Particle diameter [μm] | Flow Rate [$m^3$/h] | Penetration efficiency [—] | $V_d/V_g$ [—] | sealing efficiency [—] |
|---|---|---|---|---|
| 5 | 29.3 | 0.87 | 3.20 E − 06 | 0.31% |
| 5 | 43.9 | 0.91 | 1.90 E − 05 | 0.47% |
| 5 | 58.5 | 0.93 | 6.60 E − 05 | 0.62% |
| 5 | 73.2 | 0.94 | 1.70 E − 04 | 0.76% |
| 5 | 87.8 | 0.95 | 3.90 E − 04 | 0.90% |
| 5 | 102.4 | 0.96 | 7.60 E − 04 | 1.04% |
| 10 | 14.6 | 0.32 | 6.10 E − 07 | 0.26% |
| 10 | 29.3 | 0.57 | 1.30 E − 05 | 0.83% |
| 10 | 43.9 | 0.69 | 7.50 E − 05 | 1.43% |
| 10 | 58.5 | 0.76 | 2.60 E − 04 | 2.01% |
| 10 | 73.2 | 0.80 | 7.00 E − 04 | 2.59% |
| 10 | 87.8 | 0.83 | 1.50 E − 03 | 3.15% |
| 10 | 102.4 | 0.85 | 3.00 E − 03 | 3.70% |
| 20 | 14.6 | 0.01 | 2.40 E − 06 | 0.03% |
| 20 | 29.3 | 0.11 | 5.10 E − 05 | 0.62% |
| 20 | 43.9 | 0.22 | 3.00 E − 04 | 1.86% |
| 20 | 58.5 | 0.33 | 1.10 E − 03 | 3.48% |
| 20 | 73.2 | 0.41 | 2.80 E − 03 | 5.27% |
| 20 | 87.8 | 0.47 | 6.20 E − 03 | 7.15% |
| 20 | 102.4 | 0.52 | 1.20 E − 02 | 9.06% |

EXAMPLE 4

Application to a Single-Family Home

The duct systems of 70 single-family homes have been sealed using an embodiment of the aerosol sealing technology. The results for one of those homes are as follows:

The home in this example was a single-story 1482 $ft^2$ house built in 1959 with ducts located in a crawl space. The layout of the ducts is shown in FIG. 7 in which all of the straight line ducts were constructed of sheet-metal, and all the curvey ducts were constructed of plastic-film ducts with a helical metal wire for support. All return ducts were located in the attic, and all supply ducts were located in the crawlspace. All sealing was performed with "Duct-Seal" by Puma Technologies, diluted 1:1 with water. The heater in the device used provided 2000 W, and the liquid injection rate was 40 cc/min. The air flowrate through the injector was determined by the fan-curve combined with the use of orifice rings at the intake of the fan. The injector fan flowrate, the pressure in the duct system, and the effective leakage area of the duct system are plotted as a function of time in the FIG. 8:

EXAMPLE 5

Coating the Inside of a Duct System

The key inputs required for applying this coating technology to ductwork are:

1) a precise definition of the length of ductwork to be sealed, 2) a layout of the duct-system, including lengths and diameters, 3) any practical limitations on the flow that can be developed in the duct, and 4) any practical limitations on the size of particles that can be generated.

As an example, to use the method to seal 10 meters of duct with a diameter of 0.15 meters, with less than 20% wasted material at the end of the 10 meter section, we need to choose a particle size, a particle density, and a carrier gas flowrate.

To accomplish this, a spreadsheet that calculates the pertinent parameters from the equations within the specified methodology yields the following results for a particle density equal to that of water.

| Particle Size [μm] | Distance into Duct [m] | Carrier Flowrate [$m^3$/h] | Velocity [m/s] | Penetration Efficiency [—] | Vd/ [—] |
|---|---|---|---|---|---|
| 5 | 10 | 700 | 11.0 | 0.94 | 3.4 |
| 5 | 10 | 1000 | 15.7 | 0.81 | 16.2 |
| 5 | 10 | 1850 | 29.1 | 0.19 | 240 |
| 5 | 10 | 2500 | 39.3 | 0.27 | 250 |
| 10 | 10 | 500 | 7.9 | 0.73 | 3.1 |
| 10 | 10 | 820 | 12.9 | 0.18 | 27.2 |
| 10 | 10 | 1000 | 15.7 | 0.23 | 28.6 |
| 15 | 10 | 400 | 6.3 | 0.47 | 2.7 |
| 15 | 10 | 500 | 7.9 | 0.20 | 7.0 |
| 15 | 5 | 500 | 7.9 | 0.44 | 7.0 |
| 15 | 2 | 500 | 7.9 | 0.72 | 7.0 |
| 20 | 10 | 380 | 6.0 | 0.13 | 3.8 |

As the stated constraint is that less than 20% of the injected material is wasted out of the end of the duct, the penetration efficiency must be less than 20%. In addition, the ratio of the turbulent diffusion velocity to the gravitational settling velocity must be greater than or equal to one. The method indicates a spectrum of combinations that would work. It also indicates that the ratio of turbulent diffusion to gravitational settling velocity is higher for smaller particles at higher velocities. On the other hand, above a certain velocity (i.e., when $\tau^*$ exceeds 15) the penetration efficiency no longer decreases with increasing flow, which places a limit on the minimum penetration efficiency attainable. Also, there may be practical limitations to the flowrate that can be produced. The table shows how smaller particles can be used at high velocities to provide a radially uniform coating. As the particle size is increased so as to reduce the required flow, the fraction of material that, is deposited by gravitational settling is increased, resulting in a coating that is less uniform in the radial dimension, but the $V_d/V_g$ ratio remains well above 1 at least up to 20 μm. The uniformity of the coating in the longitudinal dimension can be observed by examining the three entries for 15 μm particles, which indicate that 35% of the material is deposited in the first 20% of the duct, and that 70% of the material is deposited in the first 50% of the duct.

It will be recognized by those skilled in the art that this description may not be the only possible description, or the most accurate description of the theory of this device and that changes can be made in form and detail without departing from the spirit and scope of the invention.

We claim:

1. A method for sealing leaks in a fluid enclosure comprising the steps of:

a) pressurizing the enclosure using a fluid flowing at a particular fluid flow rate from a fluid injection location to and through leaks in said enclosure and providing a particular differential pressure across the leaks;

b) providing particles in a size range, such that a substantial portion of said particles in said size range are transported by said particular fluid flow from said injection location through said enclosure to said leaks without contacting the surfaces of said enclosure until said particles reach a location at or adjacent to said leaks; and c) introducing said particles into said fluid flowing to and through said leaks, wherein said particles substantially retain their shape and adhere to the enclosure wall and to each other at impact at locations adjacent to the leaks to build up a bridge of particles to span between the boundaries of each of said leaks.

2. The method according to claim 1, further comprising the steps of:

choosing a particular sealing efficiency calculated from a relationship among said particle size range, said particular fluid flow rate, and said particular differential pressure across the leaks;

choosing a first parameter from among the set of parameters which include said particle size range, said particular fluid flow rate, and said particular differential pressure across the leaks;

choosing a second parameter from among the set of parameters which include said particle size range, said particular fluid flow rate, and said particular differential pressure across the leaks, but do not include the first parameter already chosen;

calculating a third parameter from among the set of parameters which include said particle size range, said particular fluid flow rate, and said particular differential pressure across the leaks, but do not include the first and second parameters already chosen to choose said third parameter to provide approximately said particular sealing efficiency chosen above;

wherein the sealing efficiency is the product of a penetration efficiency P, and a deposition efficiency, $\eta$.

3. The method according to claim 2, wherein said steps of choosing said first parameter, choosing said second parameter, and calculating said third parameter includes the additional requirement that said penetration efficiency be calculated and be 90% or greater.

4. The method according to claim 2, wherein said steps of choosing said first parameter, choosing said second parameter, and calculating said third parameter includes the additional requirement that said penetration efficiency be calculated and be 70% or greater.

5. The method according to claim 2, wherein said steps of choosing said first parameter, choosing said second parameter, and calculating said third parameter includes the additional requirement that said penetration efficiency be calculated and be 50% or greater.

6. The method as recited in claim 1, wherein said particles are in a size range between 1 and 100 microns in diameter.

7. The method as recited in claim 6, wherein said particles are in a size range between 2 and 40 microns in diameter.

8. The method as recited in claim 7, wherein said particles are in a size range between 3 and 15 microns in diameter.

9. The method according to claim 6, wherein said particles are non-spherical and have an aerodynamic diameter between 1 and 100 microns.

10. The method as recited in claim 1, wherein the fluid flow rate generated is between 20 and 20,000 cubic meters per hour.

11. The method as recited in claim 10, wherein the fluid flow rate generated is between 100 and 5,000 cubic meters per hour.

12. The method as recited in claim 11, wherein the fluid flow rate generated is between 200 and 600 cubic meters per hour.

13. The method as recited in claim 1, wherein the particles are a solid phase aerosol whose preparation comprises the steps of:

a) diluting a sealant suspended in a carrier liquid, b) injecting the sealant suspended in the carrier liquid into the fluid flow, and c) reducing the degree of saturation of the vapor phase of the carrier liquid in the fluid flow.

14. The method as recited in claim 13, wherein reducing the degree of saturation of the vapor phase of the carrier liquid is accomplished by drying the gas in said fluid flow.

15. The method as recited in claim 13, wherein reducing the degree of saturation of the vapor phase of the carrier liquid is accomplished by heating the gas in said fluid flow.

16. The method as recited in claim 13, wherein the solid phase aerosol is suspended in water.

17. The method as recited in claim 13, wherein a gas used to generate said fluid flow is air.

18. The method as recited in claim 3, wherein pressurizing the enclosure comprises the steps of:

a) closing any intentional openings in the enclosure, b) isolating or removing coating-sensitive structures from the interior of the enclosure.

19. The method as recited in claim 18, wherein pressurizing the enclosure comprises the additional step of using a filter at an intentional opening of said enclosure to reduce internal pressure and increase fluid flow velocities.

20. The method as recited in claim 18, wherein pressurizing the enclosure comprises the additional step of inducing turbulence to help keep particles suspended in the airflow.

21. The method according to claim 1, wherein the leaks to be spanned include a minimum span of 3 mm or more.

22. A The method for sealing leaks in a fluid enclosure comprising the steps of:

a) pressurizing the enclosure using a fluid flowing at a particular fluid flow rate from a fluid injection location to and through leaks in said enclosure and providing a particular differential pressure across the leaks;

b) providing particles in a size range, such that a portion of said particles in said size range are transported by said particular fluid flow from said injection location through said enclosure to said leaks without contacting the surfaces of said enclosure until said particles reach a location at or adjacent to said leaks; and c) introducing said particles into said fluid flowing to and through said leaks, wherein said particles substantially retain their shape and adhere to the enclosure wall and to each other at impact at locations adjacent to the leaks to build up a bridge of particles to span between the boundaries of each of said leaks wherein when calculating the numeric relationship among said particles in said size range, said particular fluid flow rate, and said particular differential pressure across the leaks for said fluid flowing through a particular set of leaks, a set of solutions consistent with the method define the value of the sealing efficiency to be 0.5% or greater;

wherein the sealing efficiency is the product of a penetration efficiency, P, and a deposition efficiency, $\eta$, as calculated from the particle size range, particular fluid flow rate, and particular differential pressure parameters for a particular set of leaks.

23. The method according to claim 22, wherein said set of solutions consistent with the method define the value of the sealing efficiency to be 1% or greater.

24. The method according to claim 23, wherein said set of solutions consistent with the method define the value of the sealing efficiency to be 3% or greater.

25. The method according to claim 24, wherein said set of solutions consistent with the method define the value of the sealing efficiency to be 6% or greater.

26. A method for sealing leaks in a fluid enclosure comprising the steps of:

a) pressurizing the enclosure using a fluid flowing at a particular fluid flow rate from a fluid injection location to and through leaks in said and providing a particular differential pressure across the leaks;

b) providing particles;

c) introducing said particles into said fluid from said fluid injection location;

wherein said particles begin to harden immediately upon introduction into said fluid flowing from said fluid injection location and substantially retain their shape and adhere to the enclosure wall and to each other at impact at locations adjacent to the leaks to build up a bridge of particles to span between the boundaries of each of said leaks.

27. The method for sealing leaks as in claim 26, wherein a minimum span between boundaries of a leak is at least 3 mm.

* * * * *